United States Patent
Perkal et al.

(10) Patent No.: US 11,362,907 B2
(45) Date of Patent: *Jun. 14, 2022

(54) SYSTEMS AND METHODS FOR CHARACTERIZING A CLIENT DEVICE

(71) Applicant: PAYPAL, INC., San Jose, CA (US)

(72) Inventors: Yotam Perkal, Beer-Sheva (IL); Shlomi Boutnaru, Modi'in-Mccabim-Re'ut (IL); Alon Fishel, Tel-Aviv (IL)

(73) Assignee: PAYPAL, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/138,669

(22) Filed: Dec. 30, 2020

(65) Prior Publication Data

US 2021/0119883 A1 Apr. 22, 2021

Related U.S. Application Data

(63) Continuation of application No. 15/857,090, filed on Dec. 28, 2017, now Pat. No. 10,911,319.

(51) Int. Cl.
*H04L 41/16* (2022.01)
*G06F 9/50* (2006.01)
(Continued)

(52) U.S. Cl.
CPC ............ *H04L 41/16* (2013.01); *G06F 9/5055* (2013.01); *G06F 21/316* (2013.01); *G06F 21/44* (2013.01);
(Continued)

(58) Field of Classification Search
CPC ... H04L 41/16; H04L 41/0816; H04L 63/123; H04L 63/1425; H04L 67/42;
(Continued)

(56) References Cited

U.S. PATENT DOCUMENTS

2002/0039371 A1 4/2002 Hedayat et al.
2005/0229255 A1 10/2005 Gula et al.
(Continued)

OTHER PUBLICATIONS

Estefan Ortiz & Cory Hayes, "In-Band Methods of Virtual Machine Detection," 8 Pages, Graduate Operating Systems, University of Notre Dame.
(Continued)

*Primary Examiner* — Nicholas R Taylor
*Assistant Examiner* — Tania M Pena-Santana
(74) *Attorney, Agent, or Firm* — Haynes and Boone, LLP

(57) ABSTRACT

Techniques are disclosed for passively characterizing a type of host or computing device which may be engaged in a transaction between the host and another computing device. Observation data corresponding to one or more sessions of network traffic between an unclassified host and a second system may be passively generated by a device characterization server. The observation data can be processed by the device characterization server using a machine-learning classifier. The machine-learning classifier can be trained with a set of training data that includes multiple sessions of network traffic from multiple training data hosts. Each session of network traffic includes an exchange of multiple packets in various embodiments, including packets sent from, and packets received by, the training data hosts. Based on the processing, the unclassified host may be characterized by the device characterization server as one of a physical computing device, a virtual machine, or a container.

20 Claims, 4 Drawing Sheets

(51) Int. Cl.
*H04L 41/0816* (2022.01)
*G06N 20/00* (2019.01)
*G06F 21/44* (2013.01)
*G06F 21/31* (2013.01)
*H04L 67/01* (2022.01)
*H04L 9/40* (2022.01)

(52) U.S. Cl.
CPC ......... *G06N 20/00* (2019.01); *H04L 41/0816* (2013.01); *H04L 63/123* (2013.01); *H04L 63/1425* (2013.01); *H04L 67/42* (2013.01)

(58) Field of Classification Search
CPC ...... H04L 43/062; G06N 20/00; G06N 20/10; G06N 20/20; G06F 9/5055; G06F 21/316; G06F 21/44; G06Q 20/30; G06Q 20/401; G06Q 30/018; G06Q 30/0609
See application file for complete search history.

(56) References Cited

U.S. PATENT DOCUMENTS

| | | | |
|---|---|---|---|
| 2007/0033252 | A1 | 2/2007 | Combest |
| 2010/0125663 | A1 | 5/2010 | Donavan |
| 2012/0150750 | A1* | 6/2012 | Law ................... G06Q 30/0641 705/76 |
| 2012/0330764 | A1* | 12/2012 | Nahidipour ............ G06Q 20/42 705/17 |
| 2013/0305335 | A1* | 11/2013 | Syed .................. G06Q 20/4016 726/7 |
| 2014/0143137 | A1* | 5/2014 | Carlson .................. G06Q 20/18 705/39 |
| 2015/0213389 | A1* | 7/2015 | Modarresi ........ G06Q 10/06393 705/7.39 |
| 2015/0264063 | A1* | 9/2015 | Jenson ................. G06Q 20/384 726/22 |
| 2015/0317749 | A1 | 11/2015 | Soviany |
| 2016/0191330 | A1 | 6/2016 | Singh |
| 2016/0357587 | A1* | 12/2016 | Yadav ..................... H04L 41/12 |
| 2017/0013007 | A1 | 1/2017 | Seigel |
| 2017/0024807 | A1 | 1/2017 | Jhamtani et al. |
| 2017/0091673 | A1* | 3/2017 | Gupta ................... G06N 20/00 |
| 2017/0093611 | A1 | 3/2017 | Arora et al. |
| 2017/0124484 | A1* | 5/2017 | Thompson ............... G06N 5/02 |
| 2018/0124073 | A1* | 5/2018 | Scherman ........... H04L 63/1425 |
| 2018/0181895 | A1* | 6/2018 | Singh .................... G06Q 40/12 |
| 2019/0207821 | A1 | 7/2019 | Perkal et al. |

OTHER PUBLICATIONS

M.Noorafiza, H.Maeda, T.Kinoshita and R.Uda, "Virtual Machines Detection Methods Using IP Timestamps Pattern Characteristic," Feb. 2016, 15 Pages, International Journal of Computer Science & Information Technology (IJCSIT) vol. 8, No. 1, Graduate School of Computer Science, Tokyo University ofTechnology, Hachioji Tokyo, Japan.

Vern Paxson, "Bro: a system for detecting network intruders in real-time," 2017, http://www.sciencedirect.com/science/article/pii/S1389128699001127.

Gary Wang, et al., "Hypervisor Introspection: A Technique for Evading Passive Virtual Machine Monitoring".

"Howto detect hosts running in virtual machines with nmap?" https://security.stackexchange.com/questions/2852/how-to-detecthosts-running-in-virtual-machines-with-nmap.

Noorafiza, et al., "Virtual Machines Detection Methods Using IP Timestamps Pattern Characteristic," International Journal of Computer Science & Information (IJCSIT), pp. 1-15, vol. 8, No. 1, Feb. 2016.

Ortiz, et al, "In-Band Methods of Virtual Machine Detection," Graduate Operating Systems, pp. 1-8, Dec. 16, 2011.

* cited by examiner

SYSTEMS AND METHODS FOR CHARACTERIZING A CLIENT DEVICE

RELATED APPLICATIONS

This application is a continuation of and claims benefits of U.S. patent application Ser. No. 15/857,090, filed Dec. 28, 2017 the contents of which are herein incorporated by reference in their entirety.

BACKGROUND

Field of the Disclosure

The present disclosure generally relates to computing devices, and more particularly, to a method and system for characterizing a client device based on traffic data.

Related Art

More and more consumers are using computing devices to purchase items and services over electronic networks such as, for example, the Internet. Consumers routinely purchase products and services from merchants and individuals alike. The transactions may take place directly between a brick and mortar or on-line merchant and the consumer, and payment is typically made by entering credit card or other financial information. Transactions may also take place with the aid of an on-line or mobile payment service provider.

Such payment service providers can make transactions easier and safer for the parties involved. Purchasing with the assistance of a payment service provider from the convenience of virtually anywhere using a mobile device is one main reason why on-line and mobile purchases are growing very quickly. One challenging aspect to facilitating purchasing is detecting when a transaction conducted through particular computing devices may be fraudulent, without negative impacts to consumers.

Thus, there is a need for an improved technique of detecting when a transaction conducted through a specific computing device may be suspect.

DETAILED DESCRIPTION

Figure 1:
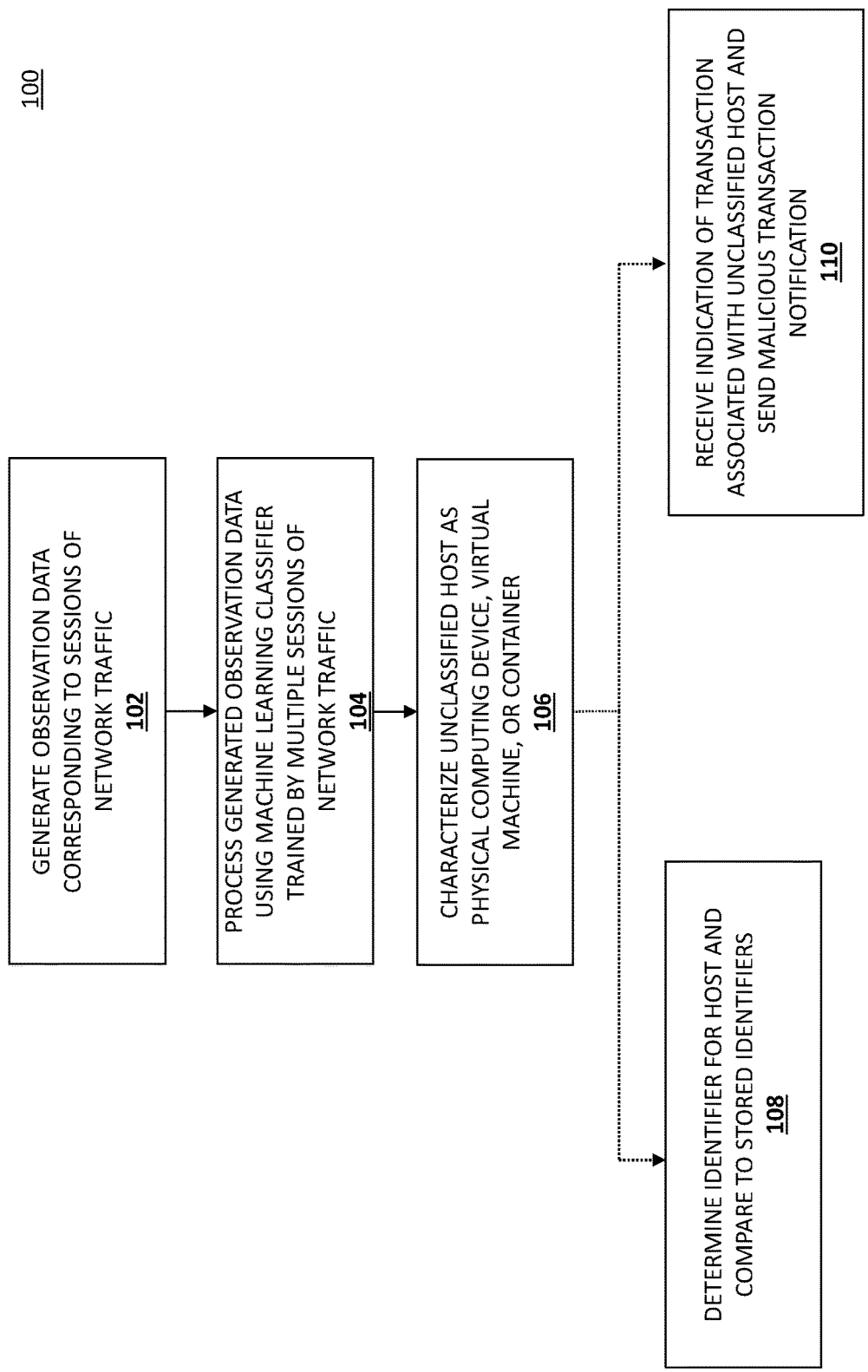
FIG. 1 is a flow chart illustrating an embodiment of a method for characterizing a client device.

The present disclosure provides a system and method for passively detecting or characterizing, by a server, a type of host or computing device which may be engaged in a transaction between the host and a second computing device, such as a server or payment processing system. Observation data corresponding to one or more sessions of network traffic between an unclassified host and a second computing system is passively generated by a server, which is referred to herein as a device characterization server. Passive generation of observation data includes, in one embodiment, generating observation data without modifying hardware or software of the unclassified host, or requiring that the unclassified host execute particular software or particular modified software. The generated observation data is processed by the device characterization server using a machine learning classifier. The machine learning classifier is trained with a set of training data that includes multiple sessions of network traffic from multiple training data hosts. Each session of network traffic includes an exchange of multiple packets, including multiple packets sent from the training data hosts and multiple packets received by the training data hosts. Based on the processing, the unclassified host is characterized by the device characterization server as one of a physical computing device, a virtual machine, or a container.

The majority of clients utilized by consumers on the Internet are physical computing devices; for example, clients utilize desktop computers, laptop computers, and mobile computing devices such as smart phones or tablet computing devices. Increasingly, virtual machines have been utilized by businesses as well as consumers for various purposes, including to access network resources and complete transactions on the Internet.

A virtual machine is, essentially, a computer with an operating system and applications that is executed within software executing on a physical computing device. The virtual machine has its own operating system, virtual processor, virtual memory (e.g., random access memory or RAM), virtual storage space (e.g., hard drive space), and other virtualized resources. Typically, the physical computing device executes virtual machine host software (sometimes referred to as a hypervisor) for managing the virtual machines and their associated virtualized hardware, and for coordinating the execution of the virtual machine and its interaction with the physical hardware of the physical host computing device. Virtual machines may be utilized by consumers, in some examples, as a method of isolating certain network traffic from the physical host computing device upon which the hypervisor or other virtual machine host software is executing. Virtual machines may be utilized, in other examples, to leverage excess computing capabilities of a physical computing device. For example, a physical computing device having a substantial amount of processing power, memory, and storage space can be "divided" among multiple virtual machines that share the physical capabilities of the computing device, such that one physical computing device can be utilized by multiple users.

Another type of client that may be utilized to interact with network resources may be referred to as a container. Containers are instances of a computing device which operate within their own user space instance within an operating system. Containers are, conceptually, similar to virtual machines, but do not necessarily require a hypervisor or other virtualization host to be executed on the physical computing device hosting the containers. Multiple containers may be executed on a physical computing device, and the containers may be isolated from each other, such that one container cannot access the resources of another container. Containers may be dedicated to a particular application; for example, one container can be utilized to execute a web browser, while another container may be utilized to execute word processing software.

Determining or classifying the host type of a client interacting with a second computing device, such as a payment processing server or other server, can be useful in many instances. For example, if the host type of the client is previously known and stored in association with an identifier (e.g., an Internet Protocol (IP) address) for the client, determining the host type for a later transaction between the client and a second computing device may be useful to verify the type of host associated with the IP address has or has not changed. Such a change in host type may be indicative of a planned change to network infrastructure, but also may be indicative of undesirable behavior of the client. Likewise, such a change in host type may be indicative of an intruder on the network. Similarly, determining the host type of a client interacting with a second computing device may be useful when planning the deployment of new software updates or determining the state of a network. As used herein, traffic is an exchange of packet data between a client (e.g., a host computing device or other type of host) and a server, or any two computing devices.

Determining the host type of a client interacting with a second computing device, such as a payment processing or other transaction server, may be useful in other instances as well. For example, the vast majority of consumers engaging in transactions with businesses utilize physical computing devices for the transaction (e.g., mobile devices, laptop computers, desktop computers, and the like). Accordingly, the traffic exchanged between a client device (e.g., a device used by a consumer) and a payment processing server to complete a transaction is typically from a physical computing device. If the traffic exchanged between a client device and a payment processing server indicates, however, that the client device is a virtual machine, or a container, that characterization of the client device may be used, along with other data, to flag the transaction as a potentially fraudulent or suspect transaction. Thus, the entity operating the payment processing server may decline the transaction, or may request that the consumer provide additional verification that the transaction is not fraudulent, before completing the transaction.

Some methods of determining the type of client accessing a server or other second computing device are active methods, in which software or hardware of the client is modified to obtain characteristics of the client, and determine the type of client device. Other methods are unable to differentiate between containers and virtual machines, or between containers and physical computing devices.

Referring now to FIG. 1, an embodiment of a method 100 for characterizing an unclassified host based on network traffic is illustrated. In the embodiments and examples discussed below, the unclassified host is described as a client device that may be executing an application, such as an application provided by a payment processing system. However, as described above, other examples of the unclassified host are also possible. For example, the unclassified host may be a client device executing a web browser program which is accessing a website provided by a payment processing system. The unclassified host may also be a first server device accessing data from another, second server device using an application programming interface (API) provided by the second server device.

The method 100 begins at block 102 where a device characterization server generates observation data corresponding to one or more sessions of network traffic between an unclassified host and a second computer system. In one embodiment, the second computer system is a server device. For example, the second computer system may be a server device operated by a payment processing system provided by a payment processor, such as PayPal of San Jose, Calif. In one embodiment, the device characterization server is operated by a same entity as the second computer system. In one embodiment, the sessions of network traffic are transmission control protocol (TCP) sessions between the unclassified host and second computer system. In one embodiment, the sessions of network traffic are user datagram protocol (UDP) sessions between the unclassified host and second computer system.

As described above, in one embodiment, observation data is generated in a manner that is completely passive. That is, modification of network traffic is not required (e.g., sending packets to a host device to actively query it and attempt to determine information about the host). Thus, observation data may be obtained without, for example, alarming or notifying malicious actors who may then modify their computing device behavior to escape detection. Further, passive generation reduces the amount of network traffic that may be needed to determine the type of host. For example, active methods require generating an amount of traffic that is not related to any given transaction, and such traffic may be otherwise superfluous and causes unnecessary consumption of network resources, such as bandwidth.

In one embodiment, observation data is generated by the device characterization server by retrieving network traffic data from the second computer system while the unclassified host and second computer system are interacting, for example, while the unclassified host and second computer system are engaged in a transaction. For example, when an unclassified host accesses a payment processing system server to obtain a landing page or initial page for completing a transaction, the device characterization server may monitor the second computer system's network traffic to generate observation data corresponding to the session(s) of network traffic between the unclassified host and the second computer system.

In one embodiment, observation data is generated by the device characterization server by retrieving network traffic data from the second computer system after an interaction between an unclassified host and a second computer system. For example, after an unclassified host and a second computer system have completed a transaction, the device characterization server may obtain the second computer system's network traffic to generate observation data corresponding to the session(s) of network traffic between the unclassified host and the second computer system.

In one embodiment, the observation data includes a time difference between receipt by the second computer system of a first packet from the classified host, and the receipt by the second computer system of a second packet from the unclassified host. In one embodiment, the first packet is a synchronize packet, which may be a TCP SYN packet. In one embodiment, the second packet is an acknowledge packet, which may be a TCP ACK packet. Other types of packets may also be used to generate observation data using the time difference between receipt of a first packet and a second packet; for example, UDP or ICMP packets may also be utilized in some embodiments.

In one embodiment, the observation data may be generated based on header data in transmission control protocol (TCP) packets. In one embodiment, header data, such as Internet Protocol version 4 (e.g., IPv4) header data, may include an Internet Protocol (IP) address of the unclassified host. In one embodiment, TCP packet header data may include a port number of the unclassified host, or a window size of the unclassified host. In one embodiment, the TCP packet header data may include a window scale value. In one embodiment, IPv4 header information may include a time to live value. The time to live value and window size value may be based on the operating system of the unclassified host. In one embodiment, the observation data may be generated based upon a time per hop for constituent packets of the sessions of network traffic between the unclassified host and the second computer system. In one embodiment, the observation data may also be generated based on a timestamp of TCP packets, or a number of packets that were in a session. In one embodiment, the fields from the TCP packet header data which are used to generate the observation data may be randomly initialized fields, such as the initial sequence number or source port fields.

Method 100 then proceeds to block 104. At block 104, the device characterization server processes the generated observation data using a machine learning classifier. In one embodiment, the machine learning classifier is trained with a set of training data that includes a plurality of sessions of network traffic from a plurality of training data hosts. Each session of the network traffic used in the training data may include an exchange of a plurality of packets sent from the training data hosts to a computing system, such as a training data computing system. Each session of the network traffic used in the training data may also include an exchange of a plurality of packets received by the training data hosts.

In one embodiment, the machine-learning classifier is a random forest-based machine learning classifier. In one embodiment, other machine-learning techniques may be utilized for the machine-learning classifier. For example, bagging trees or an adaptive boost machine learning technique may be utilized for the machine-learning classifier. A support vector machine may also be utilized for the machine-learning classifier.

In one embodiment, the machine learning classifier is trained using one or more computing devices which exchange sessions of network traffic over a public network (e.g., the Internet) with a remote computing device used to generate training data for training the machine learning classifier, such as a server. In one embodiment, a plurality of computing devices are used to exchange network traffic over the public network with the remote computing device. For example, a first computing device may be used to exchange network traffic indicative of network traffic from a physical computing device, a second computing device may be used to execute a hypervisor with a virtual machine to exchange network traffic indicative of traffic from a virtual machine, and a third computing device executing one or more containers to exchange network traffic indicative of traffic from a container. In one embodiment, one computing device is used to exchange network traffic over the public network with the remote computing device for all three types of hosts (the physical computing device, the virtual machine, and the container). Utilizing one computing device for all three types of host may have benefits when training the machine learning classifier. For example, utilizing one computing device may reduce or remove variability in the training data caused by variances in network traffic between, for example, a first computing device utilized as a physical machine and a second computing device executing a hypervisor with a virtual machine. Additionally, utilizing one computing device for all three types of hosts may result in network delay across the three types of hosts being relatively consistent, thereby improving the training data used to train the machine learning classifier. In one embodiment, multiple computing devices may be used to exchange network traffic over the public network with the remote computing device for purposes of training the machine learning classifier. For example, a first, second, and third computing device may each be used to act as a physical computing device, virtual machine, and container to exchange traffic with a remote computing device. Furthermore, in one embodiment, virtual machines and containers running on the computing device used to exchange network traffic may be configured to network with the host device in a bridge mode.

Additionally, exchanging sessions of network traffic over a public network, as opposed to a private network (e.g., a local area network) may result in the training data being more indicative of real world scenarios, and thus, the trained machine learning classifier may perform more accurate detection between types of hosts. For example, traffic over a private network may not evidence significant enough differences between types of hosts.

In one embodiment, training the machine learning classifier may include extracting features from the training data that includes the sessions of network traffic over a public network. Thus, for example, the average time difference between the first and last packets in a session, normalized by the session length (e.g., the number of total packets in the session) may be extracted as a feature for use in training the machine learning classifier. Additionally, the time difference between the receipt of a TCP SYN packet and a TCP ACK packet in the training data of sessions of network traffic may be extracted for use in training the machine learning classifier (if the packets are not TCP packets, analogous features in a header of the packet may be used instead). A time difference per hop feature, as determined by the average time difference normalized by the average time-to-live value, may also be extracted for IPv4 sessions of network traffic. For IPv6 sessions of network traffic, a hop limit field may be used in place of the average time-to-live value. Another feature that may be extracted from the training data is the mean or average of the data offset field of the packets in each training data session. Likewise, the average window size of the packets in the training data session may be extracted, considering the window scale of the packets, as determined from header data. The average time difference in packets as normalized by the session size (or the sum of the lengths of all the packets) may also be extracted and used in training the machine learning classifier. Additionally, the ratio between time scale value difference and actual time difference of the sessions of network traffic in the training data may be extracted and used in training the machine learning classifier.

In one embodiment, the data in the training data is balanced between each type of host to be classified (e.g., physical computing device, virtual machine, and container) to ensure that the trained machine learning classifier does not exhibit any bias toward a type of host. In general, the more data that is provided to train a machine learning classifier, the better. However, if the training data includes a disproportionately high amount of sessions of network traffic from, for example, physical computing devices, the trained machine learning classifier will tend to incorrectly classify traffic from an unclassified host as a physical computing device, because the data in the training set was not balanced. Thus, the data in the training data used to train the machine learning classifier may be proportionately balanced between the classifications to be used.

Once the various features from the training data are extracted, the classifier may be trained using the extracted features. For example, in a random forest machine learning classifier, a plurality of decision trees may be created based on the extracted features by sampling a number of cases at random, and selecting predictor variables based on the predictor variables that provide a more effective split. At each node of a decision tree, additional predictor variables are chosen to create the decision trees, which in turn create the random forest of the machine learning classifier. Once the machine learning classifier is trained, whether random forest-based or otherwise, the classifier is tested and validated to ensure that the results from the classifier match the expected output, based upon data provided to the classifier.

Method 100 then proceeds to block 106. At block 106, the unclassified host is characterized as one of a physical computing device, a virtual machine, or a container (e.g., a Docker, a Kubernetes container, or other type of container). The unclassified host is characterized by the device characterization server based on the processing by the machine learning classifier.

In one embodiment, after the unclassified host is characterized as one of a physical computing device, a virtual machine, or a container, method 100 may proceed to block 108, where an identifier of the host is determined. For example, an IP address or another identifier (unique or otherwise) may be determined for the host. Based on the identifier, it may be determined whether the identifier of the previously uncharacterized and now classified host matches a stored identifier for a previously-classified host. For example, a database may store identifiers for previously-classified hosts, and the previously-classified hosts may be associated with a computing device classification. If the identifier of the previously uncharacterized, and now classified host matches a stored identifier for a previously-classified host, the result of the characterization may be compared with the computing device classification for the classified host. This may be useful, in one example, to determine that a computing device associated with an identifier is operating as expected and has not been compromised. Similarly, this may be useful to determine that a network has not been accessed in an unauthorized manner by an unauthorized device.

In one embodiment, after the unclassified host is characterized as one of a physical computing device, a virtual machine, or a container, method 100 may proceed to block 110, where an indication of a transaction associated with the unclassified host is received. If the unclassified host is characterized as a virtual machine or a container, in one embodiment, a malicious transaction notification corresponding to the transaction may be transmitted to a payment processing system. For example, such a malicious transaction notification may be utilized alone or with other data to flag a transaction as malicious, so that a payment processing system can deny the transaction or request additional validation information for the transaction. In one embodiment, although block 108 and block 110 are depicted separately, both block 108 and block 110 may be performed after an unclassified host is characterized as described with respect to block 106.

Figure 2:
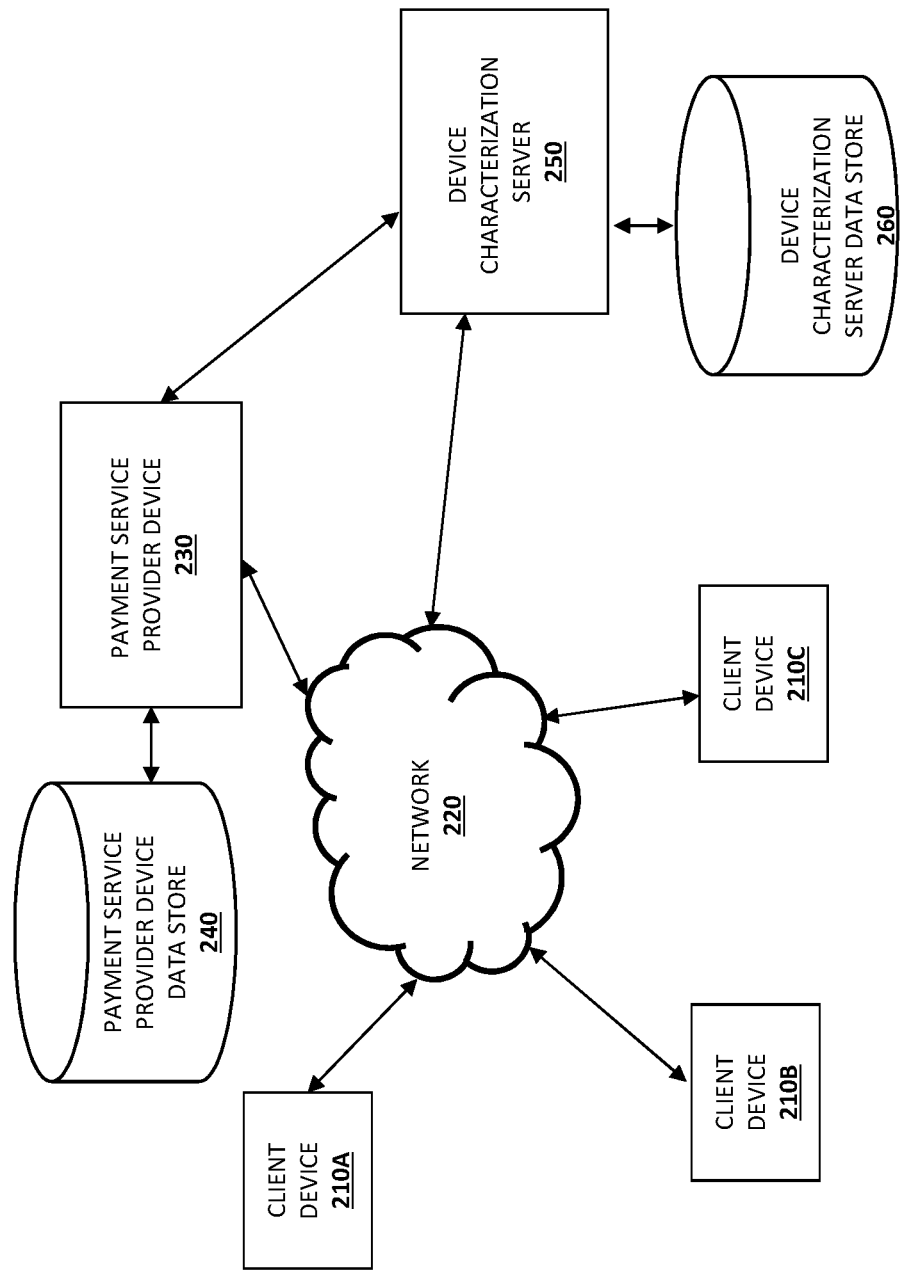
FIG. 2 is a schematic view illustrating an embodiment of a networked system.

Referring now to FIG. 2, an embodiment of a networked system 200 for implementing one or more processes described herein is illustrated. As shown, network-based system 200 may comprise or implement a plurality of servers, computing devices, and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 2 may be deployed in other ways and that the operations performed and/or the services provided by such servers may be combined or separated for a given implementation and may be performed by a greater number or fewer number of servers. One or more servers or computing devices may be operated and/or maintained by the same or different entities.

The embodiment of the networked system 200 includes one or more client devices 210a-210c that are coupled to a network 220, which may include, for example, mobile devices, desktop computers, tablet computers, laptop computers, virtual machines executing on virtual machine hosts, containers executing on a host device, and the like. The client devices 210 may be implemented using any appropriate combination of hardware and/or software configured for wired and/or wireless communication over network 220. The client devices 210 may include one or more browser applications which may be used, for example, to provide a convenient interface to permit the client to browse information available over the network 220. For example, in one embodiment, the browser application may be implemented as a web browser configured to view information available over the Internet.

Networked system 200 further includes a payment service provider device 230, connected to network 220. The payment service provider device 230 may be a payment processing device, such as a server, and provide functionality described herein, such as processing credit card payments and payments for online purchases. One such payment processing device 230 may be operated by a payment service provider such as, for example, PAYPAL® Inc. of San Jose, Calif. Payment service provider device 230 may also be coupled to payment service provider data store 240. Payment service provider data store 240 may be, in one embodiment, a database which stores, among other data, traffic data for a transaction or a session between one or more client devices 210 and payment service provider device 230. The data stored in payment service provider data store 240 may be accessed by other devices, for example, the device characterization server 240.

Networked system 200 further includes a device characterization server 250, connected to network 220. The device characterization server 250 may provide the functionality described herein, such as obtaining packet data from a transaction server, such as a payment service provider device 230 (or associated payment service provider data store 240), generating observation data, processing the observation data using a machine learning classifier, and characterizing unclassified hosts. In some embodiments, the device characterization server 250 may also train the machine learning classifier as described herein, using training data that includes sessions of network traffic. In some embodiments, the device characterization server 250 may be coupled to a device characterization server data store 260. The device characterization server data store 260 may store, in one embodiment, network traffic data between client devices 210 and payment service provider device 230. In one embodiment, device characterization server data store 260 may also store associations between an identifier for a client device 210 and a characterization or classification of the client device corresponding to the identifier.

The client devices 210, payment service provider device 230, and device characterization server 240 may each include one or more processors, memories, and other appropriate components for executing instructions such as program code and/or data stored on one or more computer readable mediums to implement the various applications, data, and steps described herein. For example, such instructions may be stored in one or more computer readable mediums such as memories or data storage devices internal and/or external to various components of the system 200, and/or accessible over the network 220.

The network 220 may be implemented as a single network or a combination of multiple networks. For example, in various embodiments, the network 220 may include the Internet and/or one or more intranets, landline networks, wireless networks, and/or other appropriate types of networks.

The client devices 210 may be implemented using any appropriate combination of hardware and/or software configured for wired and/or wireless communication over network 220. For example, in one embodiment, the client devices 210 may be implemented as a personal computer of a user in communication with the Internet. In other embodiments, the client device 210 may be a smart phone, personal digital assistant (PDA), laptop computer, virtual machine, container, and/or other types of computing devices.

The client devices 210 may also include one or more software applications which may be used, for example, to provide user-side processing for performing desired tasks in response to operations selected by the user. The client devices 210 may further include other applications as may be desired in particular embodiments to provide desired features to the client devices 210. The other applications may include security applications for implementing user-side security features, programmatic user applications for interfacing with appropriate application programming interfaces (APIs) over the network 220, or other types of applications. Email and/or text applications may also be included, which allow the user to send and receive emails and/or text messages through the network 220. The client devices 210 include one or more user and/or device identifiers which may be implemented, for example, as operating system registry entries, cookies associated with the browser application, identifiers associated with hardware of the client devices 210, or other appropriate identifiers, such as a phone number or Internet Protocol address.

Figure 3:
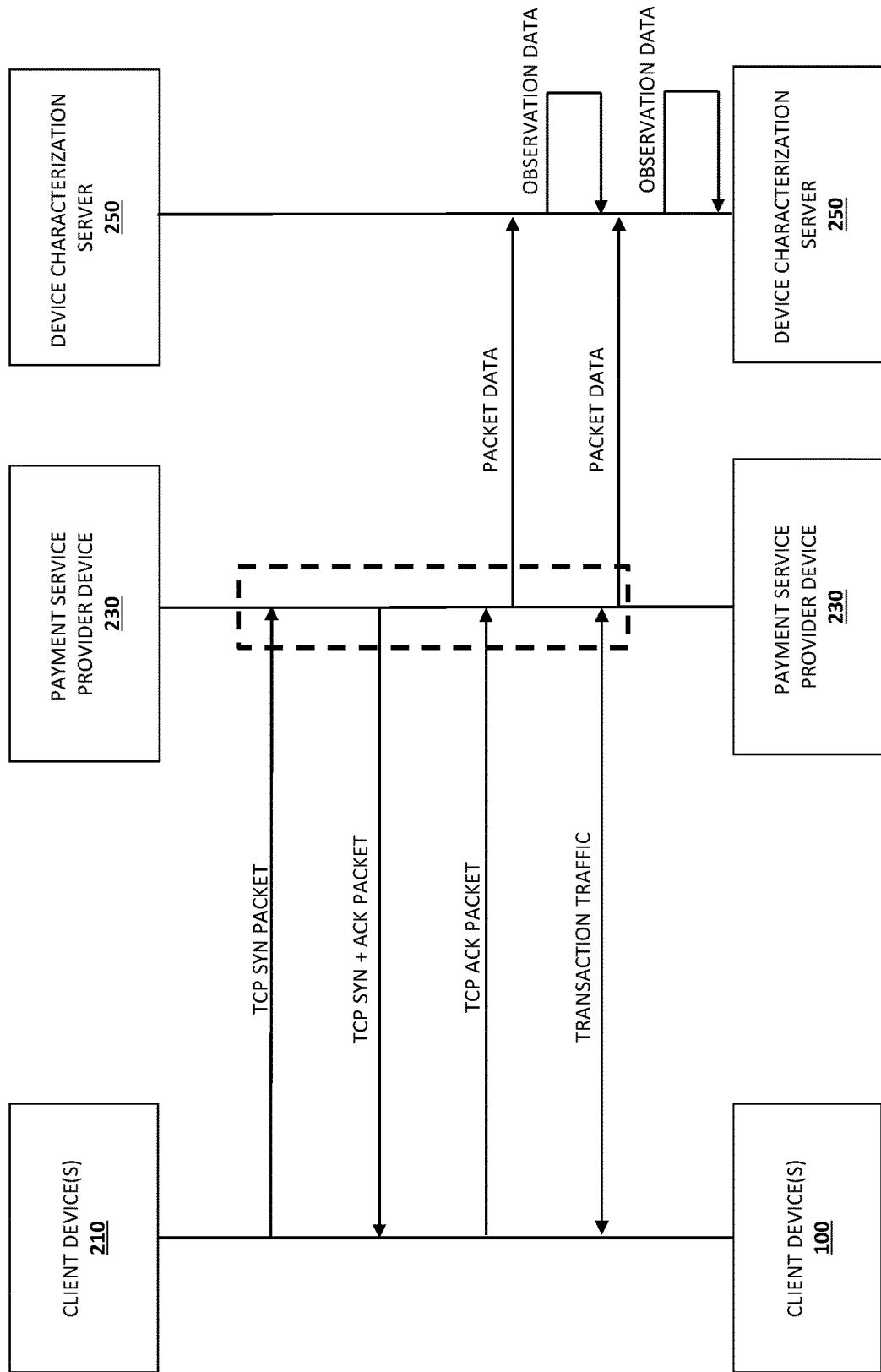
FIG. 3 is a swim lane diagram illustrating an example interaction for characterizing a client device.

Referring now to FIG. 3, an illustrative swim lane diagram 300 is depicted. The swim lane diagram provides an example of interactions between a client device 210, a payment service provider device 230, and a device characterization server 250. As depicted in swim lane diagram 300, when accessing payment service provider device 230, a client device 210 initially sends a TCP SYN (or synchronize) packet to the payment service provider device 230. The payment service provider device 230 may then respond to the client device 210 by sending a TCP SYN+ACK packet. In response, the client device 210 transmits, to the payment service provider device 230, a TCP ACK packet. After that interaction (or in part, during that interaction), the device characterization server 250 may obtain the data corresponding to the packet data exchange between the client device 210 and payment service provider device 230, and generate observation data based on the data exchange. Further, as shown in the swim lane diagram 300, client device 210 and payment service provider device 230 may exchange transaction traffic between each other. The device characterization server 250 may obtain the data corresponding to the transaction traffic packet data exchange between the client device 210 and payment service provider device 230, and generate observation data based on the data exchange. The observation data may be used to characterize the client device, as described herein.

Figure 4:
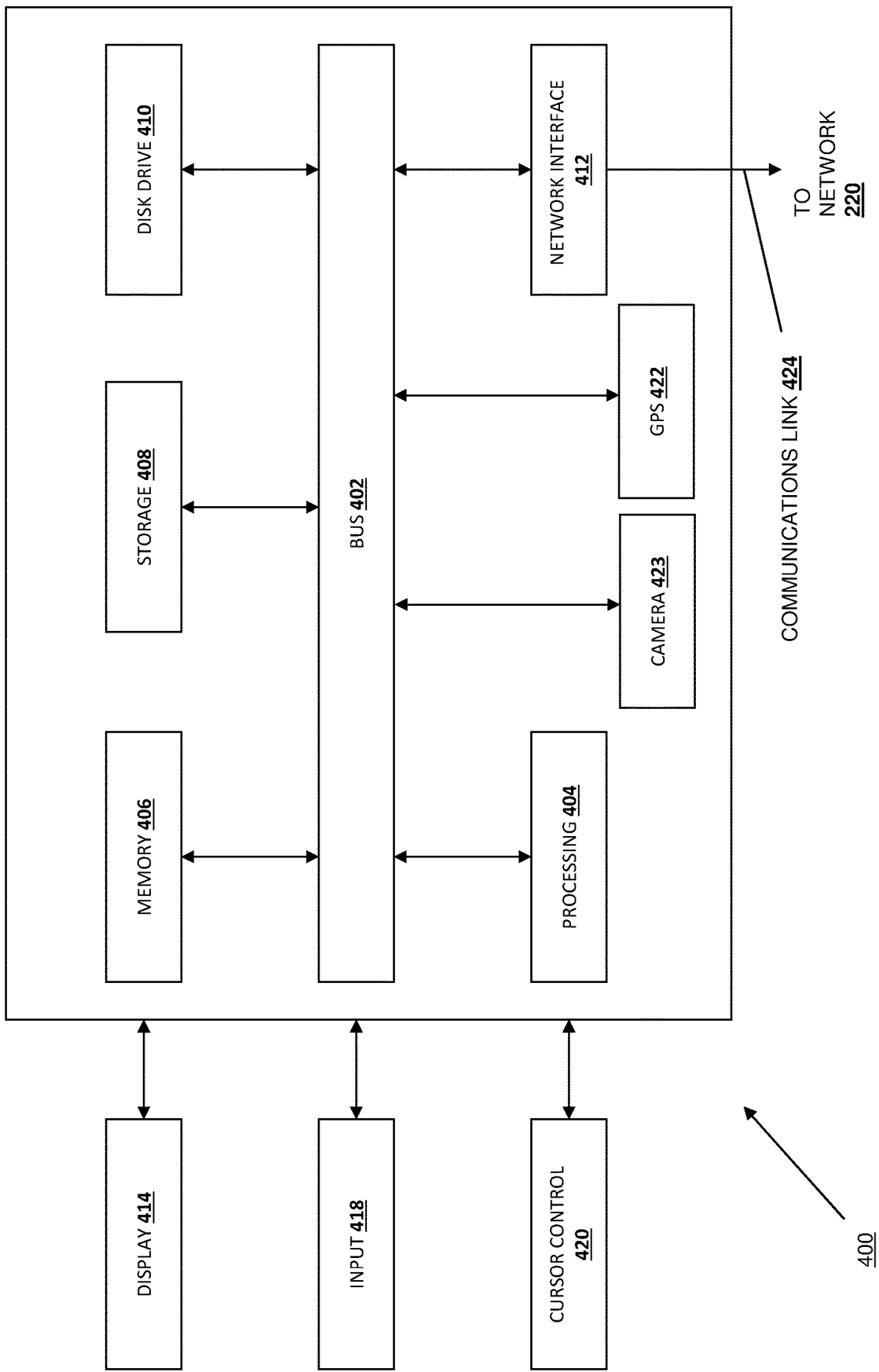
FIG. 4 is a schematic view illustrating an embodiment of a computing device; and Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

Referring now to FIG. 4, an embodiment of a computer system 400 suitable for implementing, for example, the client devices 210a-210c, the payment service provider device 230, and/or the device characterization server 250, is illustrated. It should be appreciated that other devices utilized in the system discussed above may be implemented as the computer system 400 in a manner as follows.

In accordance with various embodiments of the present disclosure, computer system 400, such as a computer and/or a network server, includes a bus 402 or other communication mechanism for communicating information, which interconnects subsystems and components, such as a processing component 404 (e.g., processor, micro-controller, digital signal processor (DSP), etc.), a system memory component 406 (e.g., RAM), a static storage component 408 (e.g., ROM), a disk drive component 410 (e.g., magnetic or optical), a network interface component 412 (e.g., modem or Ethernet card), a display component 414 (e.g., CRT or LCD), an input component 418 (e.g., keyboard, keypad, or virtual keyboard), a cursor control component 420 (e.g., mouse, pointer, or trackball), and/or a location determination component 422 (e.g., a Global Positioning System (GPS) device as illustrated, a cell tower triangulation device, and/or a variety of other location determination devices known in the art.) In one implementation, the disk drive component 410 may comprise a database having one or more disk drive components.

In accordance with embodiments of the present disclosure, the computer system 400 performs specific operations by the processor 404 executing one or more sequences of instructions contained in the memory component 406, such as described herein with respect to the client devices 210a-210c, the payment service provider device 230, and/or the device characterization server 250. Such instructions may be read into the system memory component 406 from another computer readable medium, such as the static storage component 408 or the disk drive component 410. In other embodiments, hard-wired circuitry may be used in place of or in combination with software instructions to implement the present disclosure.

Logic may be encoded in a computer readable medium, which may refer to any medium that participates in providing instructions to the processor 404 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 410, volatile media includes dynamic memory, such as the system memory component 406, and transmission media includes coaxial cables, copper wire, and fiber optics, including wires that comprise the bus 402. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 400. In various other embodiments of the present disclosure, a plurality of the computer systems 400 coupled by a communication link 424 to the network 220 (e.g., such as a LAN, WLAN, PTSN, and/or various other wired or wireless networks, including telecommunications, mobile, and cellular phone networks) may perform instruction sequences to practice the present disclosure in coordination with one another.

The computer system 400 may transmit and receive messages, data, information and instructions, including one or more programs (i.e., application code) through the communication link 424 and the network interface component 412. The network interface component 412 may include an antenna, either separate or integrated, to enable transmission and reception via the communication link 424. Received program code may be executed by processor 404 as received and/or stored in disk drive component 410 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method, comprising:
   accessing, by a first computer system, host network observation data that was passively generated and that corresponds to one or more sessions of network traffic between an unclassified host and another computer system, the unclassified host being a physical computing device, a virtual machine, or a container;
   based on a set of comparison network observation data, the first computer system performing an analysis of the host network observation data to characterize the unclassified host, wherein the comparison network observation data includes a plurality of sessions of network traffic from a plurality of training data hosts, each session of the plurality of sessions of network traffic including an exchange of a plurality of packets, each exchange including a first plurality of packets sent from the training data hosts and a second plurality of packets transmitted to the training data hosts;
   based on a result of the analysis, the first computer system making a characterization of the unclassified host as one of the physical computing device, the virtual machine, or the container; and
   making a determination to approve or deny a request from the unclassified host to perform an electronic transaction corresponding to an electronic transaction service, wherein the determination is based on the characterization of the unclassified host as one of the physical computing device, the virtual machine, or the container.

2. The method of claim 1, wherein performing the analysis of the host network observation data includes using a machine-learning classifier that was trained using the comparison network observation data.

3. The method of claim 2, wherein training the machine-learning classifier includes extracting a first plurality of network traffic features from the comparison network observation data.

4. The method of claim 3, wherein using the machine-learning classifier to perform the analysis of the host network observation data includes extracting a second plurality of network traffic features from the host network observation data, wherein the first and second plurality of network traffic features have at least two features in common.

5. The method of claim 1, wherein the electronic transaction is a monetary transaction between a sender of funds and a receiver of funds.

6. The method of claim 5, wherein making the determination to approve or deny the request from the unclassified host to perform the electronic transaction is based on a monetary amount of the electronic transaction.

7. The method of claim 5, further comprising:
   based on the characterization of the unclassified host as one of the physical computing device, the virtual machine, or the container, transmitting a request to the unclassified host for additional validation information for the electronic transaction.

8. The method of claim 1, wherein the comparison network observation data includes a time difference between receipt, by a second computer system, of a first packet from the unclassified host and receipt, by the second computer system, of a second packet from the unclassified host.

9. The method of claim 8, wherein the first packet is a synchronize packet, and wherein the second packet is an acknowledge packet.

10. The method of claim 1, wherein making the characterization of the unclassified host includes characterizing the unclassified host as the virtual machine or the container, and flagging the electronic transaction as potentially fraudulent.

11. The method of claim 1, further comprising:
    transmitting, to the unclassified host and to a merchant system, a notification of whether the request to perform the electronic transaction was approved or denied.

12. A non-transitory computer-readable medium having stored thereon instructions that are executable by a computer system to cause the computer system to perform operations comprising:
    accessing host network observation data that was passively generated and that corresponds to one or more sessions of network traffic involving an unclassified host, the unclassified host being a physical computing device, a virtual machine, or a container;
    based on a set of comparison network observation data, using a machine-learning classifier to perform an analysis of the host network observation data to characterize the unclassified host, wherein the machine-learning classifier was trained using the comparison network observation data, and wherein the comparison network observation data includes a plurality of sessions of network traffic from a plurality of training data hosts, each session of the plurality of sessions of network traffic including an exchange of a plurality of packets, each exchange including a first plurality of packets sent from the training data hosts and a second plurality of packets transmitted to the training data hosts;

based on a result of the analysis, making a characterization of the unclassified host as one of the physical computing device, the virtual machine, or the container; and making a determination to approve or deny a request from the unclassified host to perform an electronic transaction corresponding to an electronic transaction service, wherein the determination is based on the characterization of the unclassified host as one of the physical computing device, the virtual machine, or the container.

13. The non-transitory computer-readable medium of claim 12, wherein training the machine-learning classifier includes extracting a first plurality of network traffic features from the comparison network observation data.

14. The non-transitory computer-readable medium of claim 12, wherein the electronic transaction is a monetary transaction between a sender of funds and a receiver of funds.

15. The non-transitory computer-readable medium of claim 14, wherein making the determination to approve or deny the request from the unclassified host to perform the electronic transaction is based on a monetary amount of the electronic transaction.

16. A computer system, comprising:
 a processor; and
 a non-transitory computer-readable medium having stored thereon instructions that are executable by the computer system to cause the computer system to perform operations comprising:
  accessing host network observation data that was passively generated and that corresponds to one or more sessions of network traffic involving an unclassified host, the unclassified host being a physical computing device, a virtual machine, or a container;
  based on a set of comparison network observation data, performing an analysis of the host network observation data to characterize the unclassified host, wherein the comparison network observation data includes a plurality of sessions of network traffic from a plurality of training data hosts, each session of the plurality of sessions of network traffic including an exchange of a plurality of packets, each exchange including a first plurality of packets sent from the training data hosts and a second plurality of packets transmitted to the training data hosts;
  based on a result of the analysis, making a characterization of the unclassified host as one of the physical computing device, the virtual machine, or the container; and
  making a determination to approve or deny a request from the unclassified host to perform an electronic transaction corresponding to an electronic transaction service, wherein the determination is based on the characterization of the unclassified host as one of the physical computing device, the virtual machine, or the container.

17. The computer system of claim 16, wherein performing the analysis of the host network observation data includes training a machine-learning classifier based on the comparison network observation data.

18. The computer system of claim 17, wherein training the machine-learning classifier includes extracting a first plurality of network traffic features from the comparison network observation data.

19. The computer system of claim 16, wherein the electronic transaction service is configured to allow monetary transactions between a plurality of user accounts of the electronic transaction service.

20. The computer system of claim 19, wherein making the determination to approve or deny the request from the unclassified host is based on account information corresponding to a particular user account of the electronic transaction service via which the unclassified host has made the request to perform the electronic transaction.

* * * * *